United States Patent

[11] 3,608,055

[72] Inventor Florren E. Long
 LaGrange, Ill.
[21] Appl. No. 782,046
[22] Filed Dec. 9, 1968
[45] Patented Sept. 21, 1971
[73] Assignee Continental Can Company Inc.
 New York, N.Y.

[54] METHOD OF SHAPING PLASTIC SHEET MATERIAL
 5 Claims, 6 Drawing Figs.
[52] U.S. Cl. .................................................. 264/316,
 18/19 F, 18/DIG. 44, 264/90, 264/334, 264/DIG. 78
[51] Int. Cl. ...................................................... B29c 1/04,
 B29c 7/00, B29c 17/04
[50] Field of Search ........................................... 264/88, 89,
 90, 92, 93, 314, 316, 334, DIG. 78; 18/19 F, DIG. 44

[56] References Cited
UNITED STATES PATENTS

| 2,648,099 | 8/1953 | Dunmire | 264/93 |
| 2,931,064 | 4/1960 | Matoba | 264/90 |
| 3,140,325 | 7/1964 | Gräff | 264/93 |
| 3,231,647 | 1/1966 | Oesterheld | 264/90 |
| 2,493,439 | 1/1950 | Braund | 264/92 |
| 2,531,540 | 11/1950 | Smith | 264/92 |
| 2,702,411 | 2/1955 | Winstead | 264/92 X |
| 3,161,915 | 12/1964 | Thiel | 264/92 X |
| 3,483,284 | 12/1969 | Shelby | 264/92 X |

Primary Examiner—Robert F. White
Assistant Examiner—J. H. Silbaugh
Attorneys—Americus Mitchell and William A. Dittmann ABSTRACT: A method of drawing a formable material by vacuum drawing in which a flexible diaphragm is placed below and next to the formable sheet material. A vacuum is applied to the underside of the flexible diaphragm to draw it and the formable sheet into a female die. The formed sheet is then withdrawn from contact with the diaphragm.

PATENTED SEP 21 1971 3,608,055

INVENTOR
FLORREN E. LONG

BY
ATT'Y.

METHOD OF SHAPING PLASTIC SHEET MATERIAL

My present invention relates to a method of drawing any formable sheet material, and particularly to vacuum drawing of a laminated polyolefin-foil material.

It is an object of my invention to provide a shaped product from a deformable sheet.

It is another object of my invention to avoid tear and provide uniform drawing of a formable material by my method.

It is still another object of my invention to provide a method for forming a laminated material with a more or less uniform amount of stretch in each of the laminations and throughout the material.

A further object of this invention is to prevent excessive yielding or rupturing of the formable material during forming of a container.

In brief, a flexible elastomeric diaphragm is applied across the opening of the female die and the bottom of the female die is connected to a source of vacuum. The sheet material to be formed is laid across the diaphragm and a frame is placed above the sheet material and presses the sheet material down onto the diaphragm. A vacuum is applied to the female die underneath the diaphragm and pulls the diaphragm and sheet material beyond its elastic limit and after a moment or two, the material sets and the frame or die is withdrawn to allow the formable sheet material to separate from the diaphragm. Gas is allowed to return to the space between the female die and the diaphragm and the resilient diaphragm returns to its original position. Now the web may be moved on until a fresh webbing material presents itself opposite the diaphragm and the cycle may be repeated.

The invention and the foregoing features will be understood more clearly by reference to the accompanying drawings and the detailed description in which.

One of the hazards in deep drawing or forming of any formable material, and particularly laminated materials, is the separation of one lamination from another. Another hazard is that materials having different durometer indices draw at different speeds, and one or the other of the materials may craze if it is drawn more rapidly than it can sustain.

Figure 1:
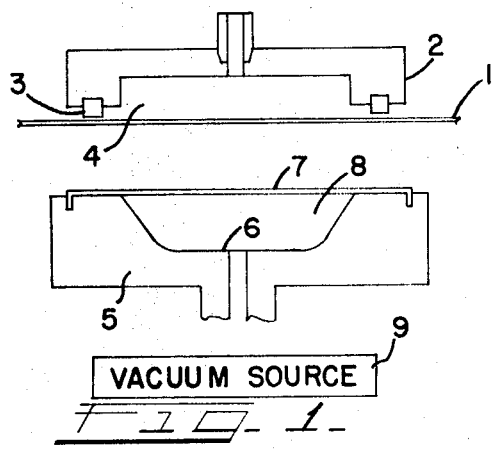
FIG. 1 shows a schematic view of the device.

A diagrammatic sketch of FIG. 1 shows a web 1 of formable material passing from left to right underneath a frame 2 which has a resilient material inset 3 along the edge of the frame to form a hermetic seal between whatever formable sheet is to be formed and the frame. The sheet and frame form a compartment 4 which is connected to the exterior of the frame and may alternatively be connected to a vent or pressure source. A female mold 5 is mounted beneath the frame 2. At the bottom of the mold is a port 6 to allow control of pressure inside the mold and stretched across the open top of the mold is an elastomeric diaphragm 7. The diaphragm is sealed to the rim of the female die 5 so that the space between the diaphragm 7 and the female die 5 forms an airtight chamber 8. A vacuum source 9 is connected to airtight chamber 8 and may be controlled by a valve to apply vacuum as desired.

Figure 2:
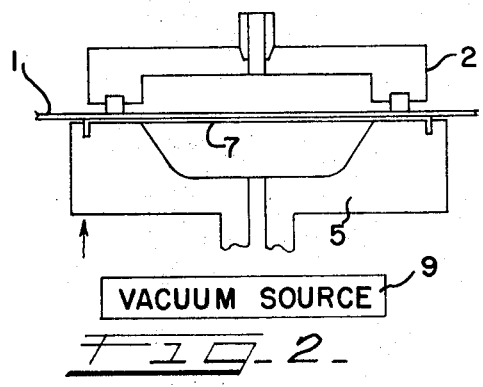
FIG. 2 shows the mold raised against the frame.

As a first step, the mold may be raised (FIG. 2) until the formable sheet 7 rests against the resilient material 3 along the edge of the frame 2 to form a hermetic seal. In this situation, the elastomeric diaphragm 7 presses tightly against the formable sheet 1.

Figure 3:
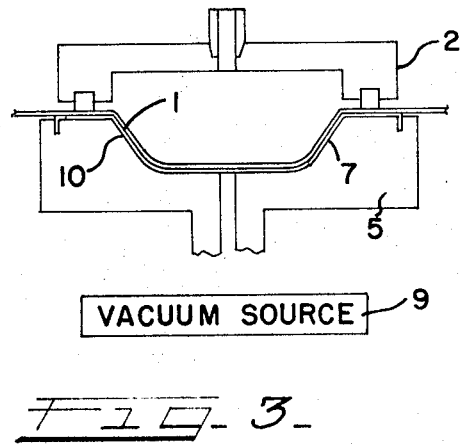
FIG. 3 shows the webs supported by the elastomeric diaphragm and drawn into the cavity.

A vacuum suction is now applied to the space 8 between the elastomeric diaphragm 7 and the female mold 5 and the elastomeric diaphragm along with the formable sheet is drawn into the female mold. The sheet and diaphragm (FIG. 3) adhere closely to the sides 10 of the female mold and are shaped by the female mold.

Figure 4:
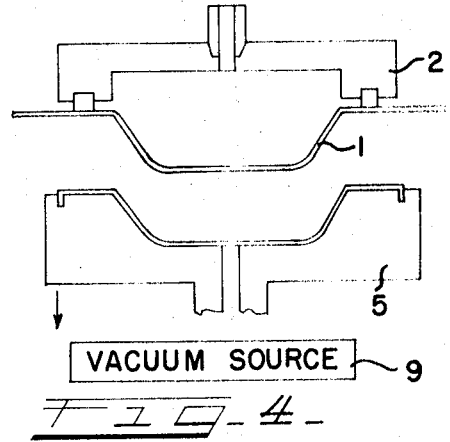
FIG. 4 shows the mold and diaphragm lowered.

Depending upon the material being drawn, the formed sheet 1 is normally allowed to set for a moment or two after initial forming (FIG. 3) so that it retains the contour of the female mold when the sheet is released from the mold. At this point, either the sheet 1 is lifted out of the female mold and diaphragm or (FIG. 4) the female mold and diaphragm are moved away from the sheet 1. In either case, the support of the female mold 5 is no longer around the formed sheet 1 and the solidified formed sheet retains its shape.

At this stage in the forming operation, the frame 2 and female mold 5 are moved away from each other a distance sufficient to allow the formed sheet 1 to be moved between them and out of the area without the formed sheet necessarily touching either the frame or female mold.

Figure 5:
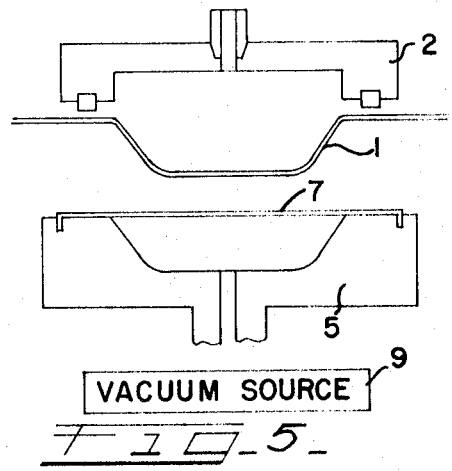
FIG. 5 shows the diaphragm returned to its initial position.
Figure 6:
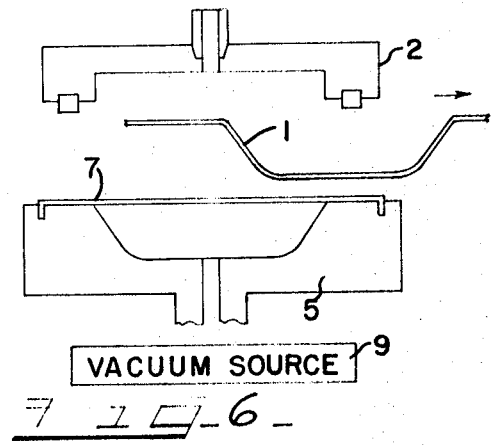
FIG. 6 shows the formed pocket advanced to make way for the next cycle.

Air is now introduced (FIG. 5) into the space between the diaphragm and the female mold. The diaphragm returns to its initial position. The diaphragm does not strike the formed sheet and alter its shape since the space between the frame and the female die is greater than the depth of the formed section of the sheet. This section of the sheet may now be moved along as shown in FIG. 6 and a fresh section placed between the frame and die in preparation for a repetition of the sequence of steps to effect forming.

If the material to be formed is laminated and the laminations are of materials with different durometer index, the rate of draw of the formable sheet 1 is controlled in large measure by the rate of draw of the elastomeric diaphragm. The elasticity and durometer index of the diaphragm is made to be between the upper and lower ranges of the durometer index of the laminated materials of the formable sheet to allow the elastomeric diaphragm to control to some extent the amount and rate of draw of each of the laminations of the sheet. The durometer index of the diaphragm is close to that of the hardest material of the sheet. The diaphragm may be made of a relatively heavy piece having greater thickness than the sheet. Thus, the diaphragm controls the rate of draw of the sheet because the sheet lies next to the diaphragm and tends to draw at the same rate as the heavy diaphragm. By varying the degree of vacuum, a variance of the speed of drawing may be effected and cracking or separating of laminations of the laminated sheets may be avoided. The rate of draw is close to the slowest rate of draw of any lamination of the sheet so that this lamination does not readily craze or crack. In this way, the formable material having the highest durometer index draws more uniformly and without crazing or cracking to avoid thin spots and open fissures, which might otherwise be present in the finished product.

Further, by the use of a diaphragm the draw is more uniformly distributed over the sheet material than would be the case if a diaphragm were not used. By distributing the draw over the lateral expanse of the sheet, concentration of stresses in small areas is avoided. Cracking and thinning of material which has been overdrawn does not occur. Also, separation between laminations is less likely to take place because there is little, if any, differential in the rate of draw between the various laminations. This is because the rate of draw is controlled by the relatively heavy elastomeric diaphragm and its rate of draw is near that of the slowest drawing lamination. It is readily apparent that there are fewer cracks and the laminations of the web materials do not separate from each other to anything like the degree that occurs when a laminated formable sheet is straight drawn without benefit of a diaphragm.

In a case where the sheet is straight drawn without a diaphragm, the bottom part of the formed container or the center part of the sheet is drawn very slightly, if at all, and the drawing is concentrated at the area of the bends, with consequent pulling, separating of laminations and cracking.

The use of this method and apparatus gives certain advantages not found in the prior art.

The use of an elastomeric diaphragm allows laminated sheets to be drawn evenly without separating, thinning or cracking.

Another advantage is that the formable sheet and diaphragm are separated before the elastomeric diaphragm is allowed to flatten. The diaphragm, rather than being relaxed to force out the formed sheet, and alter the shape of the sheet, is separated from the sheet while both are in the formed condition. By separating the two before relaxing the diaphragm, the shape of the formed sheet is preserved.

Another advantage is that the diaphragm is flattened after the formed sheet has been removed a sufficient distance from the diaphragm to avoid damage to the formed section of the sheet. This damage would occur if the heavy diaphragm struck the formed section.

A final advantage is that a container of the sort shown in the illustrated figures is formed to have a flat rim without the distortion of residual stresses and a flat rim lends itself to high-speed sealing.

The foregoing is a description of an illustrative embodiment of the invention, and it is applicant's intention in the appended claims to cover all forms which fall within the scope of the invention.

What is claimed is:

1. A method of shaping a distensible plastic sheet material comprising the steps of:

placing a sheet of distensible plastic material against a heavier gauge flat elastomeric diaphragm which is backed by a female die;

placing a frame having a resilient projecting rim in coaptation to said diaphragm so that the rim, sheet, and diaphragm form a hermetic seal with each other;

evacuating air from the space between said diaphragm and said die at a rate to draw said diaphragm and sheet against the interior of said die to form said sheet while avoiding damage to said sheet;

setting the formed sheet so that it will retain the contour of the female die upon release therefrom;

moving said diaphragm and said formed sheet apart to separate said formed sheet from said diaphragm;

halting said movement when the bottom of said formed sheet is above the top of said die; and allowing fluid to return to the space between said diaphragm and said die whereby said elastomeric diaphragm is allowed to return to its original position without damaging the formed sheet.

2. A method of shaping a distensible plastic sheet material as set forth in claim 1 in which said step of moving comprises the steps of:

moving said die away from said sheet in a direction normal to the plane of said sheet a distance sufficient whereby the bottom of said formed sheet clears the top of said female die; and allowing said sheet to lie against said frame.

3. A method of shaping distensible plastic sheet material as set forth in claim 1 in which said step of moving comprises:

lifting said frame and sheet away from said female die; and separating said sheet from said female die.

4. A method of shaping a distensible plastic sheet material as set forth in claim 1 comprising the additional step of:

moving said sheet laterally to remove said formed segment of said sheet from between said frame and said die to present fresh material so that the series of operations may be repeated.

5. A method of shaping a distensible plastic sheet material as set forth in claim 1 in which said step of evacuating comprises:

applying vacuum to the space between the elastomeric diaphragm and the female die; and varying the degree of vacuum at a rate that draws the distensible plastic sheet into the female die along with the diaphragm without cracking the distensible plastic sheet.